United States Patent [19]

Pally et al.

[11] Patent Number: 4,921,058

[45] Date of Patent: May 1, 1990

[54] WEIGHING APPARATUS WITH PROTECTIVE WIND SCREEN MEANS

[76] Inventors: Roland Pally, Pfisterhoelzli 14, CH-8606 Griefensee; Erwin Meixner, Sunnebuelstrasse 80, Ch-8604 Volketswil, both of Switzerland

[21] Appl. No.: 367,139

[22] Filed: Jun. 16, 1989

[30] Foreign Application Priority Data

Aug. 5, 1988 [CH] Switzerland .................. 2973/88

[51] Int. Cl.$^5$ ...................... G01G 23/18; G01G 21/00
[52] U.S. Cl. ..................................... 177/181; 177/126
[58] Field of Search ............... 177/126, 127, 180–182, 177/238–239

[56] References Cited

U.S. PATENT DOCUMENTS

| | | | |
|---|---|---|---|
| 4,465,152 | 8/1984 | Schmitter | 177/180 |
| 4,664,207 | 5/1987 | Knothe et al. | 177/181 |
| 4,666,005 | 5/1987 | Komoto et al. | 177/180 |
| 4,676,327 | 6/1987 | Luechinger | 177/126 |
| 4,821,821 | 4/1989 | Kelley | 177/181 |

Primary Examiner—George H. Miller, Jr.
Attorney, Agent, or Firm—Laubscher, Presta & Laubscher

[57] ABSTRACT

A protective wind screen (9) for weighing scales is provided that is of hollow generally tubular construction adapted for vertical mounting on the upper surface (15) of the scale housing (3) concentrically about the movable weighing pan (7). The wind screen includes a plurality of movably connected wall members at least one of which is of U-shaped construction including a base portion and a pair of spaced upwardly extending leg portions (25, 27) between which is a plate (17) is mounted. Preferably, the plate is mouned for removal from the U-shaped wall member, thereby to permit access for initial weighing adjustment of the scale, or for loading of the scale. A mounting shoulder is provided on the housing for preventing lateral movement of the wind screen when mounted on the housing upper surface.

10 Claims, 2 Drawing Sheets

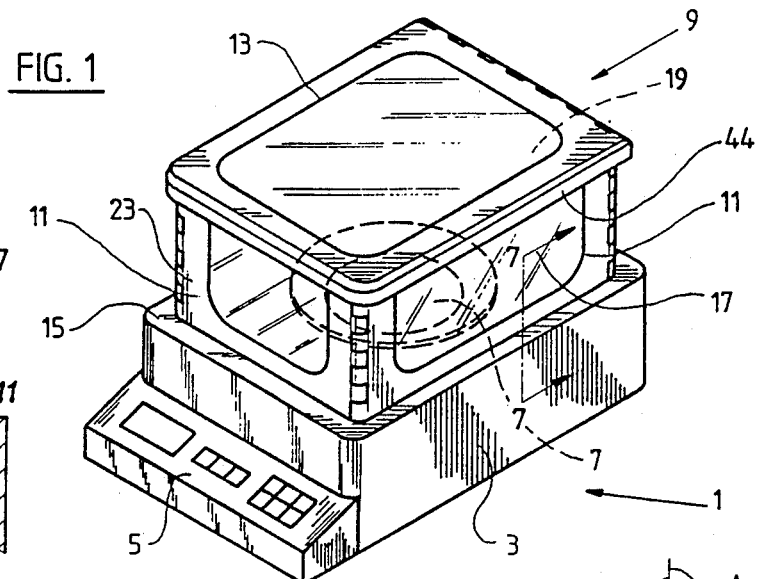
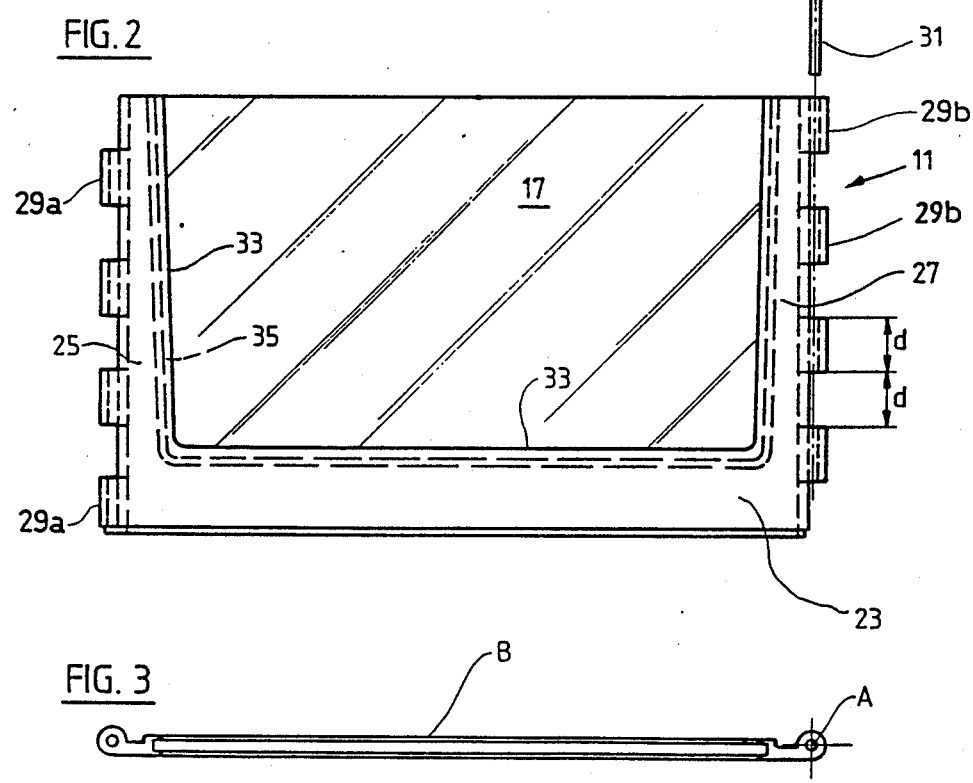

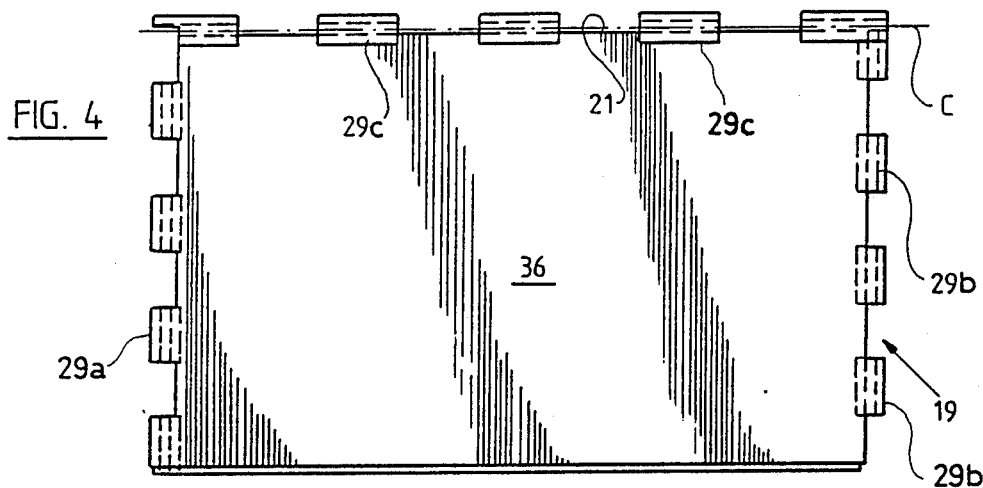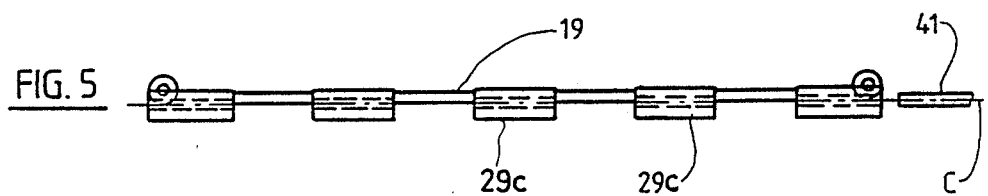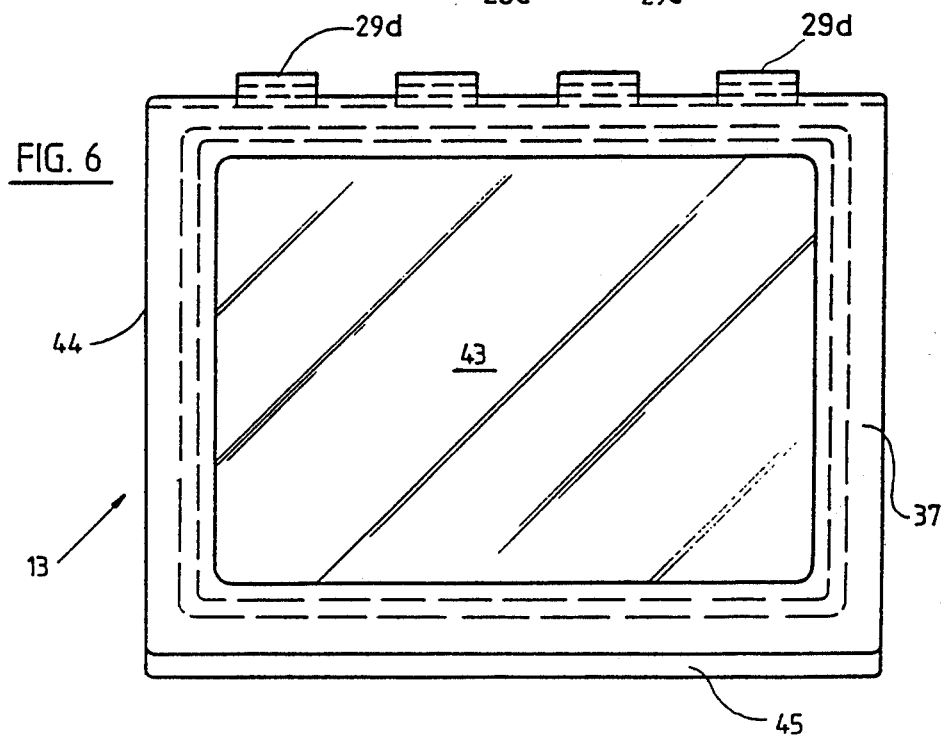

WEIGHING APPARATUS WITH PROTECTIVE WIND SCREEN MEANS

STATEMENT OF THE INVENTION

A protective wind screen is provided for precision weighing apparatus having an exposed weighing pan, which wind screen includes a generally tubular open-ended vertically arranged assembly of movably connected vertical wall members mounted concentrically about the weighing pan.

BRIEF DESCRIPTION OF THE PRIOR ART

Wind screens for precision weighing apparatus are known in the prior art, as evidenced by the prior Swiss patent No. 560,893, wherein a hollow body is formed by a plurality of wall components connected at their adjacent edges. Although this known wind screen successfully prevents the weighing result from being adversely affected by air currents, it does hinder scale operation since the scale must always be loaded from the top, and because it is impossible to gain access to the pan from the side.

The present invention was developed to provide an improved wind screen which, on the one hand, affords complete wind protection and, on the other hand, in no way restricts accessibility to the weighing pan.

SUMMARY OF THE INVENTION

Accordingly, a primary object of the present invenntion is to provide an improved wind screen for precision balances having a vertically movable weighing pan arranged above the housing of the weighing apparatus, which wind screen includes a plurality of movably connected wall members that define an open-ended generally tubular structure mounted concentrically about the weighing pan, at least one of said wall members comprising a U-shaped frame between the legs of which is removably mounted a plate, preferably formed of a transparent material.

According to the present invention, the user of the balance can, if desired, remove a given plate from the wind screen for loading the weighing pan from the front or from the side of the scale without removal of the entire wind screen from the balance housing. The plate, which is designed to be inserted downwardly between the vertically upwardly extending leg portions of the U-shaped wall frames, can be removed from the frame without the necessity of any tools, and does not require any further attachment means. Interlocking tubular hinge sleeves are provided at the adjacent edges of the wall members to provide simple assembly and stable mutual connection of the wind screen wall members. Preferably the hinge axes of the wall members are displaced inwardly for containment in the plane of the inner surface of a given wall member, thereby to permit compact collapsing of the wind screen when not in use, thereby facilitating the transport and storage of the wind screen.

According to a more specific object of the invention, a lid member may be hingedly connected with the rear vertical wall for closing the upper end of the wind screen, use being made of interlocking aligned hinge sleeve portions on the lid and rear wall members for hingedly connecting the lid member to the wind screen. Stop shoulder means on the upper surface of the housing prevent lateral movement of the wind screen means relative to the housing. Preferably one edge of the lid member projects outwardly beyond the wind screen wall members to afford handle means for pivotally raising the lid to provide vertical access to the weighing pan.

BRIEF DESCRIPTION OF THE DRAWINGS

Other objects and advantages of the invention will become apparent from a study of the following specification, when viewed in the light of the accompanying drawings, in which:

FIG. 1 is a perspective view of a precision weighing apparatus provided with the wind screen means of the present invention;

FIGS. 2 and 3 are front elevation and top plan views, respectively, of one of the front and side members of the wind screen of FIG. 1;

FIGS. 4 and 5 are front elevation and top plan views, respectively, of the wind screen of FIG. 1;

FIG. 6 is an elevational view of the top lid member; and

FIG. 7 is a detailed sectional view taken along line 7—7 of FIG. 1.

DETAILED DESCRIPTION

Referring first more particularly to FIG. 1, the precision weighing apparatus or balance 1 includes a housing 3 having an operating and display keyboard 5, and a weighing pan 7 connected for vertical movement relative to the upper surface 15 of the housing. In accordance with the present invention, a wind screen means 9 is provided which is designed for mounting on the upper surface 15 of the housing to protectively enclose the weighing pan 7, whereby ambient wind currents will have no adverse effect on the weighing measurement. In the illustrated embodiment, the wind screen means includes vertically arranged hingedly-connected front, side and rear walls 11 and 19, respectively. Hingedly connected to the upper edge of the rear wall 19 is a lid member 13 which is operable to the closed horizontal position illustrated in FIG. 1 to close the upper end of the wind screen means. If desired, in order to prevent horizontal lateral displacement of the wind screen means relative to the housing, the housing may be provided with internal shoulder means 3a that extend upwardly concentrically within the lower edge portion of the wind screen means, as shown in FIG. 7.

Each of the front and sidewalls 11 of the wind screen includes a U-shaped frame 23 having a base portion 24 and a pair of upwardly extending leg portions 25, 27, as shown in FIG. 2. A transparent plate 17 is slidably inserted downwardly between the leg portions 25 and 27, the edge portions of the transparent plate being received in a groove 35 formed in the interior edge portions 33 of the leg and base portions of the U-shaped frame 23. In order to hingedly connect the four vertical wall members, each wall member is provided on its vertical edge portions with a plurality of aligned vertically spaced tubular sleeve portions 29 of equal width and spacing distance d. As shown in FIG. 2, the tubular hinge sleeves 29a on the leg portion 25 are offset from the tubular hinge sleeve portions 29b on the leg portion 27, thereby to permit interlocking aligned arrangement of the hinged sleeve portions of the adjacent edges of a pair of wall members, whereupon a hinge pin 31 may be inserted downwardly within the aligned tubular hinge sleeves to pivotally connect the wall members together. As shown in FIG. 3, the hinge sleeves 29a and 29b at each of the vertical sides of a wall member are displaced rearwardly to cause the hinge axes A to be contained in the plane B of the rear surface of the wall member, thereby to afford compact collapsing of the wind screen means when not in use.

The transparent plates 17 may be formed of glass or of a suitable synthetic plastic material. If desired, the grooves 35 in the leg portions 25 and 27 of the U-shaped frame may be arranged at an acute angle relative to each other, thereby to afford a force fit as the transparent plate 17 is inserted downwardly within the associated frame.

Referring to FIGS. 4 and 5, the rear wall member 19 includes a rectangular plate 36 the vertical sides of which are provided with the aforementioned vertically spaced aligned tubular hinge sleeves 29a and 29b, respectively.

Furthermore, at its upper edge, the rear wall plate 36 is provided with a plurality of horizontally spaced aligned tubular hinge sleeve portions 29c that are arranged for interlocking cooperation with corresponding tubular hinge sleeves 29d on the rear edge of the lid member 13, whereby upon the insertion of the horizontal hinge pin 41, the lid members 13 are pivotally connected with the rear wall of the wind screen means. The lid member 13 includes a frame 37 containing an opening in which is mounted a transparent plate 43. If desired, the plate may be permanently secured to the lid frame by a suitable adhesive. Alternatively, the lid 43 may be mounted for removal from the lid frame, thereby to provide access to the weighing pan 7. The circumferential edge portion 44 of the lid member 13 is rounded, and preferably the lid includes at least one portion 45 that extends outwardly beyond a side or front wall of the wind screen means, thereby defining a handle means for manually raising or lowering the lid relative to the wind screen vertical walls.

After opening the lid 13, the operator can, if desired, remove one or more of the plates 17 from the front or sidewalls, thereby to facilitate loading of the scale.

The wind screen means according to the present invention can be collapsed for transport and/or storage, or if desired, the hinge pins 31 and 41 may be removed from the associated wind screen members to disassemble the apparatus.

Although the wind screen means has been illustrated as being provided with four hingedly connected walls, it is apparent that if the number of the hingedly connected walls were to be increased, the wind screen would have a more circular configuration, and thereby correspond to the configuration of the weighing pan.

While the preferred forms and embodiments of the invention have been illustrated and described, it will be apparent to those skilled in the art that various changes may be made without deviating from the inventive concept set forth above.

What is claimed is:

1. Wind screen means for use with weighing apparatus including a housing (3) having an upper surface (15), and a weighing pan (7) connected with said housing for movement relative to said upper surface, comprising: generally tubular open-ended vertically-arranged wind screen means (9), adapted for mounting on said housing upper surfce concentrically about said weighing pan, said wind screen means including:
   (a) a plurality of vertically-arranged wall members (11); and
   (b) means (31, 29a, 29b) connecting said wall members for movement relative to each other;
   (c) at least one of said wall members comprising:
     (1) a generally U-shaped vertically arranged frame (23) including a horizontal base portion (24), and a pair of upwardly extending leg portions (25,27); and
     (2) a plate member (17) mounted between said leg portions.

2. Apparatus as defined in claim 1, wherein said plate member is slidably mounted for vertical downward insertion within, and vertical upward removal from, said frame, respectively.

3. Apparatus as defined in claim 2, wherein the adjacent edges (33) of said frame leg portions contain grooves (35) for receiving the corresponding edge portions of said plate, respectively.

4. Apparatus as defined in claim 3, wherein at least one of said plates is transparent.

5. Apparatus as defined in claim 1, wherein said connecting means comprises:
   (1) a plurality of aligned vertically spaced tubular sleeve portions (29a, 29b) extending outwardly from the vertical edges of each of said wall members, respectively, the sleeve portions at opposite edges of each of said wall members being offset relative to each other to permit interlocking alignment of the sleeve portions at one edge of one wall member and the corresponding sleeve portions of the adjacent edge of the companion wall member; and
   (2) hinge pins (31) extending through the aligned sleeve portions of companion pairs of said wall members to hingeably connect the same.

6. Apparatus as defined in claim 5, wherein said tubular sleeve portions on each side of said wall member are arranged to cause the hinge axes (A) of the hinge pins to lie in the plane (B) that contains the inner surface of said wall member.

7. Apparatus as defined in claim 5, wherein said wall members includes a rear wall member (19) provided at the upper edge with a plurality of horizontally aligned and spaced tubular sleeve portions (29c); and further including
   (d) a lid member (13) including at one edge a plurality of aligned horizontally spaced tubular sleeve portions (29d) intermediate and in alignment with said rear wall upper edge sleeve portions; and
   (e) a horizontal hinge pin (41) extending through said horizontally aligned tubular portions for pivotally connecting said lid and rear wall members, said lid being operable to a horizontal position to close the upper end of said wind screen means.

8. Apparatus as defined in claim 7, wherein said lid member contains an opening, and further including a plate (43) mounted in said opening.

9. Apparatus as defined in claim 7, wherein said lid member includes a circumferential outer edge portion that is rounded, at least a part of said circumferential lid edge portion extending downwardly when said lid member is in the horizontal closed position relative to said wind screen means; and further wherein one edge portion of said lid member extends outwardly beyond one of said side and front walls to define a handle.

10. Weighing apparatus, comprising:
   (a) a housing (3) having an upper surface (15);

(b) a weighing pan (7) connected with said housing for vertical movement relative to said housing upper surface;

(c) generally tubular vertically arranged wind screen means (9) mounted on the upper surface of said housing concentrically about said weighing pan, said wind screen means including:

(1) a plurality of vertically arranged wall members (11); and (2) means connecting said wall members for movement relative to each other;

(3) at least one of said wall members comprising a generally U-shaped vertically arranged frame (23) including a horizontal base portion (24) and a pair of upwardly extending leg portions (25, 27), and a plate member (17) mounted between said leg portions; and (d) means (3a) preventing lateral horizontal displacement of said wind screen means relative to said housing.

* * * * *

UNITED STATES PATENT AND TRADEMARK OFFICE
CERTIFICATE OF CORRECTION

PATENT NO. : 4,921,058

DATED : May 1, 1990

INVENTOR(S) : Roland Pally and Erwin Meixner

It is certified that error appears in the above-identified patent and that said Letters Patent is hereby corrected as shown below:

ON TITLE PAGE:

Assignee: Mettler Instrumente AG
(a Swiss Corporation)
Greifensee, Switzerland

Signed and Sealed this

Tenth Day of March, 1992

Attest:

HARRY F. MANBECK, JR.

*Attesting Officer*  *Commissioner of Patents and Trademarks*